Dec. 14, 1965     L. D. KLEISS     3,223,107

ANALOG PROCESS CONTROL APPARATUS

Filed Sept. 29, 1961     2 Sheets-Sheet 1

INVENTOR.
L. D. KLEISS

BY *Hudson & Young*

ATTORNEYS

3,223,107
ANALOG PROCESS CONTROL APPARATUS
Louis D. Kleiss, Borger, Tex., assignor to Phillips Petroleum Company, a corporation of Delaware
Filed Sept. 29, 1961, Ser. No. 141,878
3 Claims. (Cl. 137—93)

This application is a continuation-in-part of U.S. application, Serial No. 754,265, of Louis D. Kleiss, filed August 11, 1958, now abandoned.

This invention relates to automatic control mechanisms and method of utilizing same in the control of systems having dead time and exponential lag.

Dead time in a system is the time elapsing between the initiation of a corrective action in the system and the detection of the effect of the corrective action upon the system. For example, a system concerned with maintaining a constant temperature in a fluid flowing in a pipe where the application of heat to the pipe is at a distance upstream of the temperature measuring device. The dead time of the system is the time required for the heated fluid to move from the heat source to the point where the temperature increase is detected. This dead time may thus be a matter of seconds or hours depending upon the length of pipe between the heat source and the temperature measuring device and the rate of flow of fluid in the pipe. Insertion of a large tank in the pipe between the aforementioned points will additionally increase the dead time.

Exponential lag is the term which applies to the gradual change in temperature such as that detected by the temperature sensing device in response to an abrupt or "step" change in the heat input to the pipe. This is the result of mixing of warm and cool elements within the pipe.

The overall effect of dead time plus exponential lag in the pipe example upon the detected temperature in response to a change in heat application is depicted by FIGURE 1. The step shaped line $H_1$ represents a step change in the heat input to the pipe and $T_o$ represents the temperature response detected by the temperature sensing device. T is dead time of the system. The exponential part of the $T_o$ curve is the result of the exponential lag of the system. A change in the heat input to the pipe will not be detected by the temperature sensing device until after dead time T and the temperature will then increase gradually, then more rapidly, and finally level off in an asymptotic approach to the $H_1$ input line.

All automatic control systems are characterized by having a controlled variable and a manipulatable variable. In the above example the temperature of the fluid is the controlled variable and the heat input is the manipulatable variable. Conventional process controllers compare a measured value of the controlled variable with the desired value and issue a corrective signal proportional to the difference between said measured and desired values of the controlled signal. The corrective signal changes the value of the manipulatable variable until the measured value of the controlled variable equals the desired value. Dead time in a system will cause the controller to make an excessive correction or "over-shoot." If the measured temperature of the fluid in the preceding pipe example falls slightly below the desired value, the controller will issue a correction signal to the heat input source to apply more heat. Because of dead time, however, the controller receives no indication that its correction, which was actually sufficient, has done any good. So it continues to apply more and more heat to the pipe as long as the measured temperature stays below the desired temperature. By the time the controller does receive word of a higher measured temperature, too much heat has been applied. The measured temperature will then go too high, the controller will call for less heat and this time will "under shoot." An endless oscillation is thus established.

Accordingly, an object of this invention is to provide an improved method of and apparatus for controlling a process. Another object of this invention is to provide an improved method for controlling a process whereby the effect or process dead time is reduced to a minimum. A further object of this invention is to provide an improved method for controlling a process wherein a manipu-atable variable is adjusted in response to a change in a controlled variable. Another object is to provide a control system for a process with dead time which system incorporates an analog of the process. Other aspects, objects and the several advantages of the invention are apparent from a study of the disclosure, the drawings and the appended claims.

The following figures serve to illustrate the present invention which provides an improved controlled process which is regulated in a precise manner by the utilization of a temperature transducer to simulate and avoid the time lag otherwise occuring in carrying out the process to be controlled.

Figure 2:
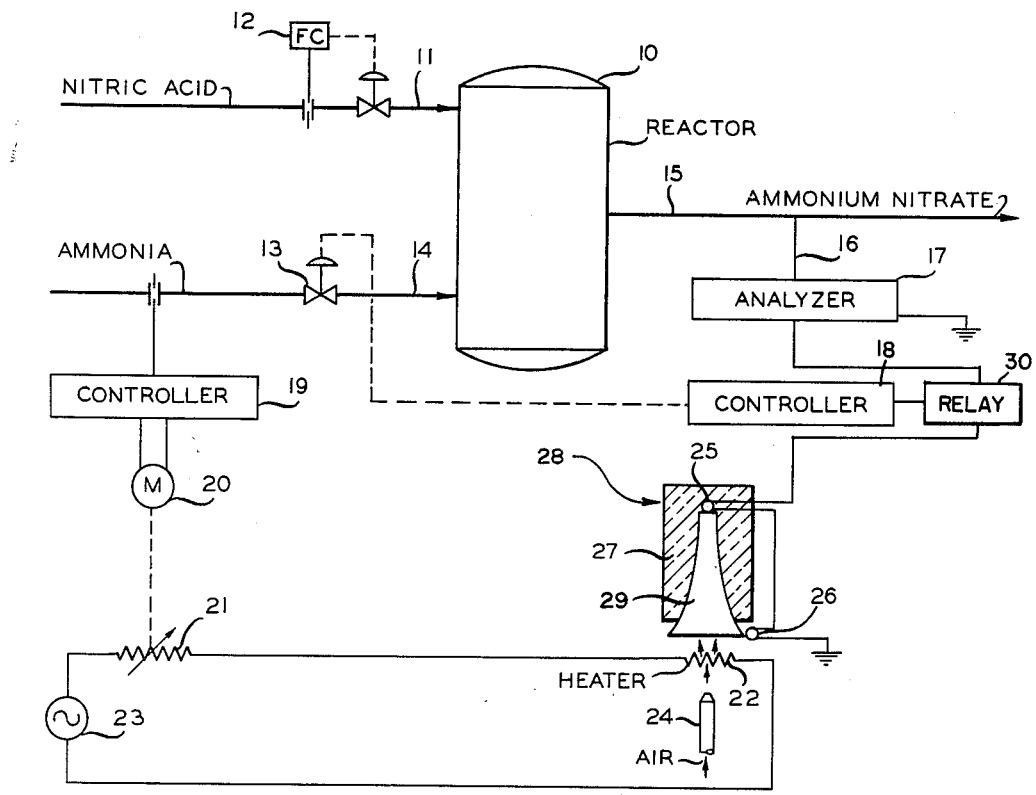
FIGURE 2 is a schematic representation of a reactor process control system of this invention.

Referring now to the drawings in detail, FIGURE 2 illustrates the use of the control system of the present invention in the process for producing ammonium nitrate by reacting nitric acid with ammonia. Nitric acid of 56 weight percent is supplied to reactor 10 through a conduit 11 at a constant rate of 120 gallons per minute, for example. This constant rate is maintained by a flow controller 12. Anhydrous ammonia is introduced into reactor 10 through a conduit 14 which has a control valve 13 therein. The ammonia normally is introduced at a rate of approximately 30.5 gallons per minute. Reactor 10, which has a volume of 100 gallons, is thus maintained at a temperature of approximately 330° F. and at a pressure of approximately 60 p.s.i.g. The product, which comprises ammonium nitrate of approximately 80 weight per cent, is removed through a conduit 15.

In normal operation, there is an excess of ammonia in the reactor effluent. A sample of this effluent is directed by a conduit 16 to an analyzer 17 which measures a property of the stream. Analyzer 17 can advantageously be a pH meter which establishes a signal representative of the pH of reactor effluent. This signal is applied through a controller 18 to adjust valve 13. If the measured pH should increase due to an excess of ammonia, valve 13 is closed somewhat to reduce the supply of ammonia to the reactor. If the measured pH decreases, valve 13 is opened.

The control system thus far described is effecitve except for the dead time in the reactor, which is of the order of 50 seconds in the described example. In order to compensate for this dead time, a flow controller 19 is employed to drive a motor 20 in a direction representative of the increase or decrease in flow through conduit 14, with respect to a reference flow rate. Reversible motor 20 adjusts a variable resistor 21 to control the current supplied to a heater 22 from a current source 23. A nozzle 24 directs a stream of air past heater 22 to the base of a transducer 28 which is an analog of the reaction system. The output of transducer 28 is applied to controller 18 in opposition to the signal from analyzer 17. The transducer thus senses actual changes in flow through conduit 14 and modifies the control signal from analyzer 17.

The analog transducer assembly 28 has thermocouples 25 and 26 which are separated by a tapered rod 29 which is surrounded by a mass of heat insulating material 27. The end of rod 29 adjacent thermocouple 26 is exposed directly to the source of heat. The heat transfer through rod 29 simulates the dead time and exponential lag in the actual system being controlled. Heat conductive materials which are useful for constructing rod 29 are those materials which have moderate heat conductivity and a reasonably high heat capacity. Examples of such materials include: stainless steel; German silver; lead; dense plastics, such as those which contain metallic and dense mineral fillers; heavy metal oxides, sulfides and carbides; and the like. It is desirable that such materials have a heat conductivity of about 10 B.T.U./(hr.) (sq. ft.) (° F./ft.). The lengths of these members and the cross-sectional areas thus regulate the time lag between the two temperature sensing elements. The heat conductive material can also serve as a thermocouple element. Thus rod 29 can be constantan, for example, and thermocouples 25 and 26 formed by attaching iron wires at each end.

To illustrate the operation of the inventive control system, if the measured pH sensed by analyzer 17 decreases, the analyzer isues a decreased signal to relay 30 which, because no signal is being received from transducer 28 (as explained below) passes the same decreased signal to controller 18. Because the measured pH signal received by controller 18 is less than the desired set point value for pH, controller 18 issues a correction signal which opens valve 13 a slight amount. This causes the flow of ammonia in line 14 to increase and a signal representative of said flow to be passed to controller 19. The latter causes reversible motor 20 to adjust variable resistor 21 so as to permit more current to flow from current source 23 through heating coil 22. Nozzle 24 directs a stream of air by heater 22 and thus causes the increased heat to be passed to the base of transducer 28. Since the entire system has been operating previously under equilibrium, the temperatures measured by thermocouples 25 and 26 were the same. Since these thermocouples are connected in opposition, their signals cancel each other and the resulting signal passed to relay 30 was zero. With the application of additional heat to transducer 28, thermocouple 26 senses a higher temperature immediately and issues an increased signal which is greater than that issued by thermocouple 25 which has not yet sensed the increased heat. Subtraction of the signal of thermocouple 25 from that of thermocouple 26 now leaves a correction or compensation signal which is applied to relay 30. The addition of the compensation signal to the decreased signal from analyzer 17 by relay 30 now produces a signal which approximately equals the set point signal applied to controller 18. The controller is thus satisfied that it has made the right correction in opening valve 13 slightly and so lets well enough alone. The addition of the compensation signal to the analyzer signal has taken place almost instantaneously.

Figure 1:
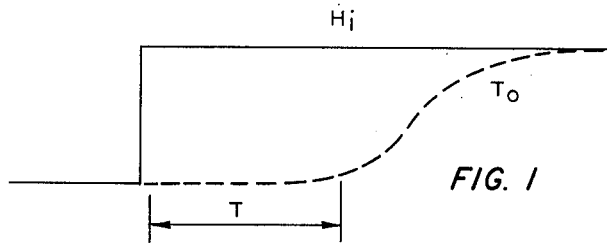
FIGURE 1 is a diagrammatic view of the effect of dead time plus exponential lag of a system.

Having applied a compensation signal to the controller and thus "fooled" the controller into believing the system is at equilibrium, the compensation signal must be removed from the controller as the value of pH measured by analyzer 17 increases, the result of the corrective action by the controller. Since the pH value, after the elapse of dead time, will increase exponentially as illustrated in FIGURE 1, then the compensation signal from transducer 28 must also decrease exponentially such that the sum of the two signals is a constant. The unique construction of analog transducer causes a compensation signal to be issued to relay 30 following a change in flow in line 14 and after a dead time lapse causes the compensation signal to decrease to zero in an exponential manner. A compensation signal is issued from transducer 28 only when thermocouple 26 senses a higher or lower temperature than does thermocouple 25. When this happens heat flows, say from thermocouple 26 to 25, until the two couples sense the same temperature.

There is a time lapse between the time couple 26 senses a higher temperature and the time couple 25 begins to sense the increased temperature. The time lapse is made to equal the dead time of the system under control and may be adjusted by the dimensions and materials used in building rod 29 in transducer 28. The rise in temperature sensed by couple 25 will be exponential and may also be made to simulate the exponential response of the system under control by changing the dimensions and materials of rod 29.

Figure 5:
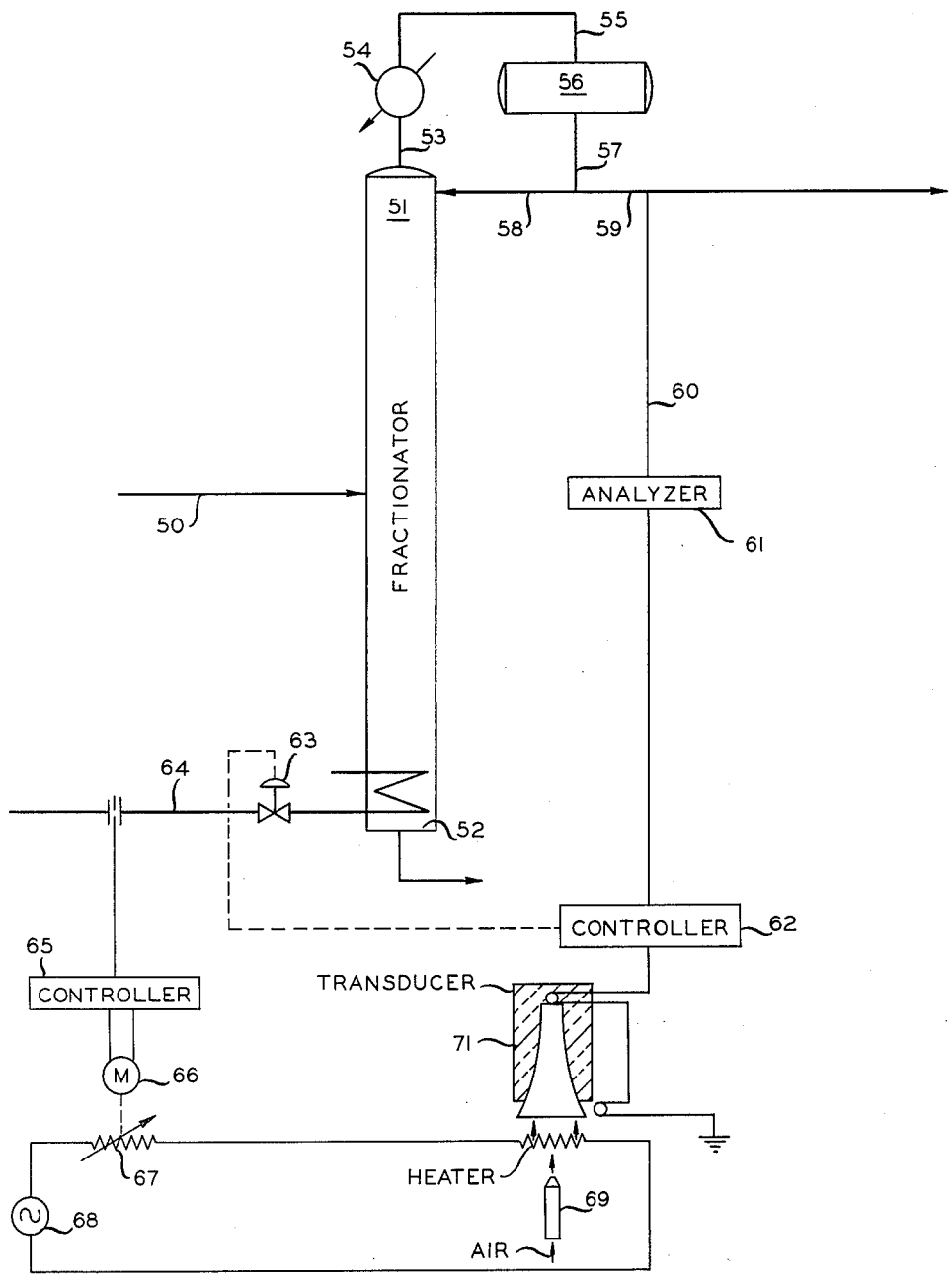
FIGURE 5 is a schematic view of a fractionation system utilizing the control system of the present invention.

While the control system of this invention has been illustrated with the ammonium nitrate process, this invention is suitable for use with any process having a dead time or time lag occurring in same. Another process suitable for carrying out this invention is a fractionation process wherein there is a time lag between the time of receiving the signal to change operating conditions and the time of actually effecting the desired change in the column. Such a process is illustrated by FIGURE 5, wherein a material to be fractionated is passed by means of conduit 50 into fractionator 51. Heat is supplied by means of reboiler 52. In operation the overhead effluent from the fractionator 51 is removed by way of conduit 53 and condensed by means of condenser 54. The condensed effluent is then passed to tank 56 by means of conduit 55. The condensed overhead is then removed by way of conduit 57 communicating with conduits 58 and 59. A portion of the condensed effluent is returned by way of conduit 58 as reflux to the column 51. The remainder of the condensed effluent is passed via conduit 59 as desired product. A sample of this effluent is directed by a conduit 60 to an analyzer 61 which measures a property of the stream and provides a signal representative of the measured property. This signal is applied through a controller 62 to adjust valve 63 in conduit 64 of the reboiler 52 either to increase or decrease the amount of heat to the reboiler as required. This control system is effective except for the dead time in the fractionator, which can be up to 30 minutes or more, depending on the size of the column and the number of trays in same. In order to compensate for the dead time, a flow controller 65 is employed to drive a motor 66 in a direction representative of the increase or decrease in flow through conduit 64, with respect to a reference flow rate. Reversible motor 66 adjusts a variable resistor 67 to control the current supplied to a heater from a current source 68. A nozzle 69 directs a stream of air past the heater to the base of a transducer 71 which is an analog of the reaction system. The output of transducer 71 is applied to controller 62 in opposition to the signal from analyzer 61. The transducer thus senses actual changes in flow through conduit 64 and modifies the control signal from analyzer 61.

Figure 3:
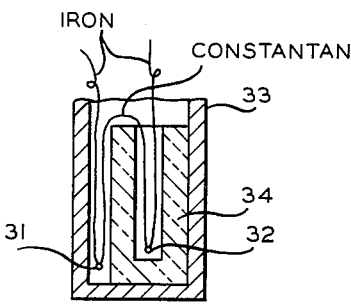
FIGURES 3 and 4 are a view of a thermocouple assembly which can be employed in the control system of FIGURE 2.

Another suitable assembly of thermocouples are 31 and 32 as illustrated in FIGURE 3 wherein both of these thermocouples are disposed in a thermowell 33 which is formed of a material having good heat conducting properties, copper or aluminum, for example. Thermocouple 32 is disposed in a well 34 which is formed of heat insulating material.

Figure 4:
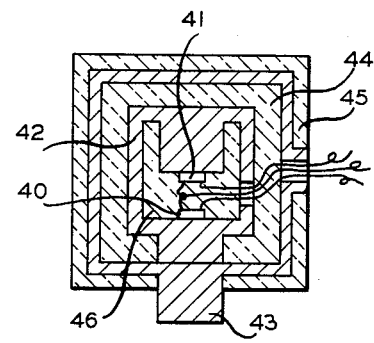

Also, as shown in FIGURE 4 temperature sensing elements 40 and 41 are attached to a housing 42 in spaced relationship with one another. The end of housing 42 is connected to a shell 43 which is formed of a metal having good heat conducting properties. This shell is exposed directly to the source of heat addition and is surrounded by a mass of heat insulating material 45. The region between housing 42 and shell 43 is filled with a mass of heat insulating material 44. The shell 43 which surrounds housing 42 insures that the two temperature sensing elements eventually attain the same temperature under steady-state conditions. The lead wires attached to elements 40 and 41 are similar to the iron leads shown in FIGURE 2.

Reasonable variations and modifications are possible within the scope of the foregoing disclosure, drawing and the appended claims to the invention, the essence of which is that there has been provided a process and apparatus substantially as set forth and described herein.

I claim:

1. In a reaction system for combining two or more streams so as to obtain a product stream therefrom and in which the combination of said streams is controlled by control means responsive to a first signal representative of an analysis of said product stream, the improvement which comprises means for compensating said control means for delay which otherwise occurs in the control of the combination of said streams including a delay simulating means composed of a first and second temperature-sensitive elements which establish second and third signals, respectively, representative of the temperature of each of said elements, a member of a heat-conductive material extending betwen said first and second elements, means adapted to change the temperature of one of said elements adjacent said member in response to the variations in said system introduced by said control means, and means to establish a compensated control signal representative of the sum of said first and second signals minus said third signal and means responsive to said compensated control signal to regulate the combination of said streams so as to avoid over-correction thereof.

2. In a system for separating by fractionation a stream having a mixture of components therein so as to obtain the separated components as separate product streams therefrom and in which the separation of said components is controlled by control means responsive to a first signal representative of an analysis of at least one of said separated product streams, the improvement which comprises means for compensating said control means for delay which otherwise occurs in the control of the separation including a delay simulating means composed of a first and second temperature-sensitive elements which establish second and third signals, respectively, representative of the temperature of each of said elements, a member of heat-conductive material extending between said first and second elements, means adapted to change the temperature of one of said elements adjacent said member in response to variations in said system introduced by said control means, and means to establish a compensated control signal representative of the sum of said first and second signals minus said third signal and means responsive to said compensated control signal to regulate the separation of said mixture of components so as to avoid over-correction thereof.

3. In an apparatus for use in controlling a process wherein changes in a second variable result in changes in a first variable after a time lag and wherein said second variable is controlled responsive to a first signal representative of said changes in said first variable, the improvement which comprises means for compensating said first signal so as to avoid said time lag in operative combination therewith a means to establish a second signal representative of a change in said second variable, first and second temperature-sensitive elements which establish third and fourth signals, respectively, representative of the temperatures of said elements, a member of heat-conductive material extending between said first and second elements, means to change the temperature of said member adjacent said second element in response to a change in said second variable, means to establish a control signal representative of the sum of said first and fourth signals minus said third signal and means responsive to said control signal to adjust said second variable.

References Cited by the Examiner

UNITED STATES PATENTS

| | | | |
|---|---|---|---|
| 2,603,422 | 7/1952 | Sargeaunt | 236—91 |
| 2,788,264 | 4/1957 | Bremer | 137—90 X |
| 2,800,394 | 7/1957 | Peters | 137—3 X |
| 2,843,138 | 7/1958 | Gilman | 137—3 X |
| 2,881,235 | 4/1959 | Van Pool | 137—93 X |
| 2,891,401 | 6/1959 | Heinrich | 137—90 X |
| 2,915,299 | 12/1959 | Woebcke | 137—90 X |
| 2,921,593 | 1/1960 | McKay | 137—624.15 X |
| 3,031,267 | 4/1962 | Martin | 137—90 X |

FOREIGN PATENTS

| | | |
|---|---|---|
| 890,136 | 9/1953 | Germany. |
| 625,571 | 6/1949 | Great Britain. |

ISADOR WEIL, *Primary Examiner.*